United States Patent [19]

Panigati

[11] 4,191,203

[45] Mar. 4, 1980

[54] FLUID CIRCUIT OR LOGIC ELEMENT

[75] Inventor: Pier L. Panigati, Lugano, Switzerland

[73] Assignee: Etablissement d'Occident, Vaduz, Liechtenstein

[21] Appl. No.: 917,883

[22] Filed: Jun. 22, 1978

[30] Foreign Application Priority Data

Jun. 27, 1977 [CH] Switzerland ........................ 7860/77

[51] Int. Cl.² ............................................ G05D 11/00

[52] U.S. Cl. .............................. 137/112; 251/DIG. 1

[58] Field of Search ............... 137/111, 112, 113, 517, 137/860; 235/201 ME; 251/DIG. 1

[56] References Cited

U.S. PATENT DOCUMENTS

| | | | |
|---|---|---|---|
| 148,041 | 3/1874 | Douds et al. | 137/112 |
| 2,778,372 | 1/1957 | Jaquith | 137/111 |
| 3,610,698 | 10/1971 | Gachot et al. | 137/113 |
| 3,633,605 | 1/1972 | Smith | 137/013 |
| 3,779,267 | 12/1973 | Cowan | 137/111 |
| 3,845,777 | 11/1974 | Gilson | 235/201 ME |
| 3,895,815 | 7/1975 | Panigati | 251/DIG. 1 |
| 4,046,159 | 9/1977 | Pégourié | 137/112 |

*Primary Examiner*—William R. Cline
*Assistant Examiner*—H. Jay Spiegel
*Attorney, Agent, or Firm*—Roylance, Abrams, Berdo & Farley

[57] ABSTRACT

An annular chamber in a housing has inlets at both ends. A central segment of the changer has on its inside wall a groove tapering toward the inside and leading at its base to a centrally located output passageway. Disposed in the groove and central segment of the chamber is an annular gate ring which has a T-shaped radial cross-section. There is sufficient clearance between the ring and the walls to permit the ring to move freely a short distance axially within its confinement. Pressure from one or the other direction of the chamber causes the ring to deform itself against one or the other side of the groove so that the top part of the T-shaped radial cross-section closes off the chamber to the other side.

2 Claims, 4 Drawing Figures

FLUID CIRCUIT OR LOGIC ELEMENT

BACKGROUND OF THE INVENTION

The invention relates to a logic element for representing the OR function. Such an element has two inlets for feeding in a fluid, an outlet, and a sealing device made from an elastic material which is displaceable under the action of the fluid in order, as desired, to bring about a connection between one or other inlet and the outlet.

Flow mechanisms representing the logic OR function are already known and the normally used logic symbol is:

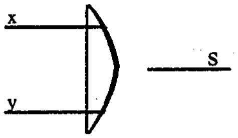

This symbol represents that a signal can only be obtained at output S if a signal is present in either x or y. It is necessary from the operational standpoint for a sealing member to be placed between the two inlets x and y which prevents any connection between the said two inlets if a signal is present either in x or y and which permits the output of a corresponding signal when the particular input signal is present in x or y.

In the conventionally used sealing members, inlets x and y are separated by means of various devices which can be subdivided into two basic types, plates and membranes. Each of these types, which fulfil their function in a positive manner, has certain disadvantages. These disadvantages result in particular from the fact that the heretofore known sealing devices function only at high or only at low operating pressures, but not at pressures of intermediate values. Thus, such logic elements cannot be freely interchanged.

FIG. 1 is a simplified representation of a logic OR element of a heretofore known first type, having a plate-like sealing device. There are shown 1 as the inlet x, 3 the inlet y and 2 the outlet S. The sealing device is itself designated by the reference numeral 4.

Generally, and at least in the most widely used types, the sealing device is a disk which largely comprises an elastic or plastics material of a suitable thickness which ensures a continuous and reliable displacement of the sealing device from one sealing point 5 to the other 6.

In response to the pressures which build up on one or other side of the sealing device due to a signal appearing in x or y, the device 4 moves until it comes into contact with opening 5 or 6 and there exerts a sealing action which prevents any connection between inlets 1 and 3, while the connection between the uncovered inlet 1 (or 3) and outlet 2 remains open.

In the same way, FIG. 2 shows in simplified form a logic form OR element with a sealing device 4' in the form of a membrane. The symbols and reference numerals are the same as in FIG. 1. The difference mainly relates to the sealing 4' which comprises a membrane of generally elastic material suspended on a plurality of filaments 7 whose function is to give the sealing device the necessary flexibility and response sensitivity. Under the thrust action of the fluid entering at 1 or 3, the connection between the two inlets 1 and 3 is interrupted and the connection is produced between the relevant inlet 1 (or 3) and the outlet 2. As opposed to disk-type devices, devices provided with membranes have a higher sensitivity, which permits an operation at much lower pressures, while not, however, permitting the maximum pressures possible with the disc-type devices.

Logic elements of the previously known types which are shown in FIGS. 1 and 2 have, as indicated hereinbefore, certain disadvantages.

On examining the sealing device 4 of FIG. 1 and particularly its construction with respect to the operation of the complete element, it is clear that the sealing device 4 in the form of the above-mentioned disk must have a certain thickness permitting a correct and operationally reliable displacement between the two sealing points 5 and 6. The main disadvantage of such a device is the necessity of a relatively high minimum operating pressure in order to ensure the reliable movement of disk 4 from one position to the other and for ensuring the sealing action on applying the disk to one or other of the sealing points 5, 6.

This operating pressure, below which it is only possible with difficulty to achieve a reliable operation, is generally about 2 bar $2.0\times10^5$ pascal. Parallel to this, the elements require for their sealing device a relatively large displacement path compared with the dimensions of those elements. In this there is sought a certain constructional miniaturisation when realising the OR function. However, the presence of a displacement of a by no means negligible magnitude limits the operating frequency, which is one of the most important characteristics in such elements. Furthermore, the necessity of using relatively high pressures solely because of the movement means that at the end of its movement the disk strikes the sealing edge at a high velocity, which in the case of prolonged operation can lead to surface wear, indentations in the disk (accompanied by the impairing of the sealing action) and fractures. Therefore, in the case of certain elements based on the same principle, the elastic material of the disk has been replaced by a synthetic material and sealing points 5 and 6 have been moved onto the actual disk, the sealing action being ensured by the pressure of the existing sealing edges on a flat surface. However, this solution requires a high quality for the surface and necessitates absolute reliability in the construction of the sealing edges, leading to higher manufacturing costs and difficulties in mass production.

The element shown in FIG. 2 is able to reach much higher frequencies, due to the greater flexibility, and therefore, sensitivity of membrane 4'. In addition, the element has the possibility of operating at very low pressures, but this advantage is counterbalanced by the unsuitability for operation at industrial pressures, which would lead to rapid destruction of the membrane. Thus, the possible uses are limited, and it is in particular necessary to take special technical measures when planning circuits.

SUMMARY OF THE INVENTION

According to the present invention, there is provided a novel logic element wherein the sealing device is annular and mounted at least partly in a slot which is also annular and is constructed as a connection between the inlets and the outlet, the outlet being positioned coaxially to the longitudinal central axis of the slot and connected with the base of the slot via a passage. The sealing device has sides which diverge from the sides of the slot and have a predetermined clearance relative to the slot size. The transverse slot size is such that together with the chamber the dimension is at least equal to the size in the longitudinal direction of the sealing device, so that this clearance permits an initial displacement of the sealing device with subsequent rotation about its own torsional axis until it engages with the whole surface of the corresponding side of the slot and thus sealingly interrupts the connection between the inlet adjacent to the side and the outlet.

DESCRIPTION OF A PREFERRED EMBODIMENT

Figure 2:
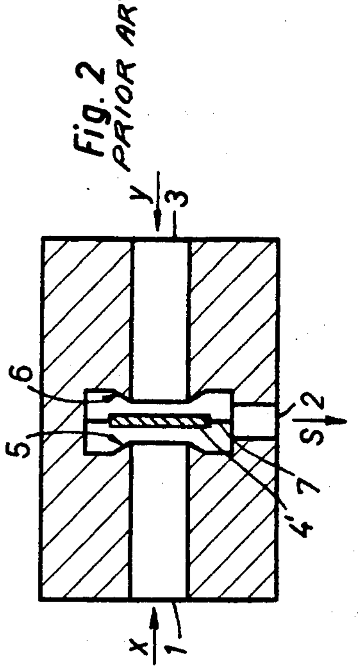
Fig. 2 PRIOR ART
FIG. 2 is a longitudinal sectional view of a logic element in accordance with a second prior art type utilizing a membrane sealing device.
Figure 3:
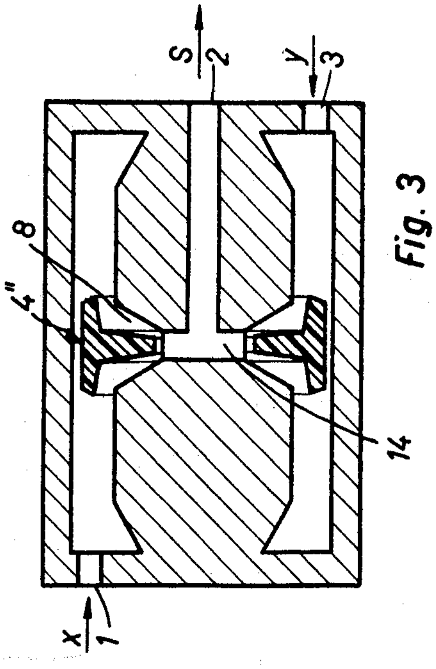
FIG. 3 is a longitudinal sectional view of a logic element in accordance with a preferred embodiment of the present invention.
Figure 1:
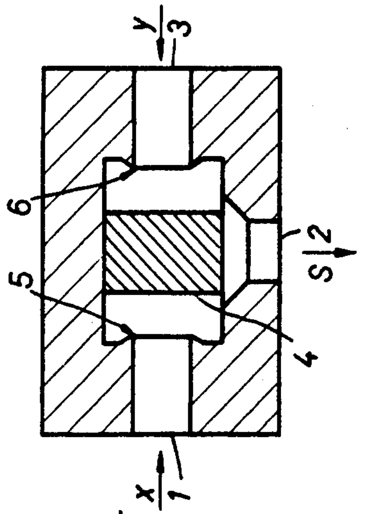
Fig. 1 PRIOR ART
FIG. 1 is a longitudinal sectional view of a logic element in accordance with a first prior art type utilizing a disc sealing device.

FIG. 3 shows the schematic construction and operation of a logic element in accordance with a preferred embodiment of the present invention. The inlets and outlet are given the same reference numerals as in the previously mentioned FIGS. 1 and 2 of the drawings. However, the behaviour of sealing device 4" is entirely different. This sealing device, whereof part is shown on a larger scale in FIG. 4, is partly located in a annular slot or chamber 8 formed in a central segment, the chamber sides 9, 10 forming a given angle $\beta$ with the sides 11, 12 of the stem of the sealing.

The dimensions of the annular slot 8 along a given line z are therefore greater than the corresponding dimensions of sealing device 4" and also at the base 13 of the slot. This is due to the angle $\beta$ and to a passageway 14 for the hydraulic fluid which connects the base 13 of the slot with outlet 2. If the hydraulic fluid flows in from one of the two inlets 1, 3 (FIG. 3), i.e. laterally from one of the sides 11, 12 of sealing device 4" (FIG. 4), the latter is displaced sideways against the corresponding side 9 or 10 of slot 8. Due to the angle $\beta$ between the corresponding sides of the slot and the sealing device and due to the presence of the pressurized fluid, forces and reactions act on the sealing device which produce a torque bringing about the rotation thereof about the circular torsion axis 15.

Figure 4:
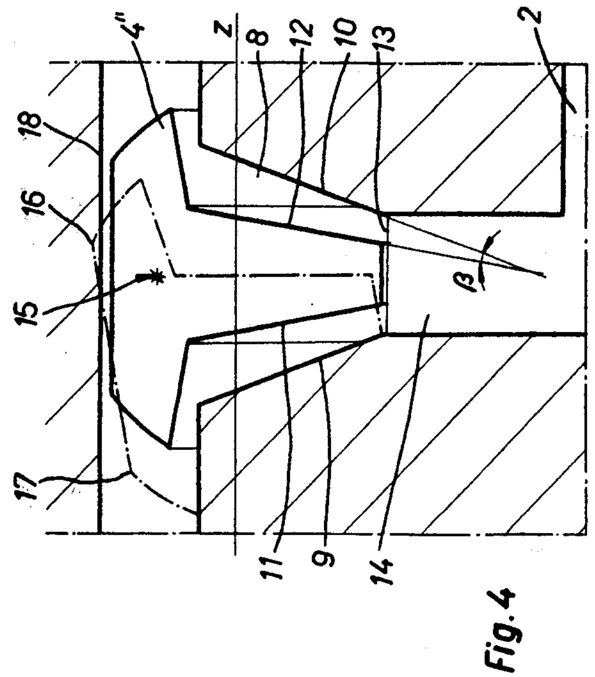
FIG. 4 is a longitudinal, partially sectional enlarged view of the fragment of the logic element of FIG. 4.

At the end of the rotation, the sealing device 4" is located in the position indicated by the broken dotted lines in FIG. 4, in which it seals along one of its sides (side 11) and on a circular line 16 (or 17 when the fluid enters from the other side). The advantages of this arrangement are clearly visible. Sealing is not brought about by a closing action about an edge of considerable precision, as in the prior element types, and instead takes place along a surface (the side of the slot), which can also be roughly machined, and along a line 16 or 17 in the same way, whereby sealing is brought about between two coaxial cylindrical surfaces.

The obvious main advantage is the fact that precision manufacturing of the individual components is unnecessary. Furthermore, the elimination of any striking against edge-like and consequently cutting surfaces obviates any possibility of a premature fracture of the sealing device, and consequently the necessity of providing the hitherto used elastic materials. It is also important that an element with a sealing device in accordance with the present invention can obtain high frequencies, because this leads to a sensitivity comparable with that of a membrane. Finally, there are necessary for this sealing device only very small displacements (together with very small rotations), which are smaller than the width of passage 14 which, due to its circular form, can have a very small size in the direction of the longitudinal axis.

There is consequently virtually no limit on the operating pressure for this sealing device. The presence of a clearance between its outer periphery and the inner surface 18 of the element, as well as the dimensions which can be selected in such a way that a maximum flexibility is ensured (without thereby prejudicing the minimum robustness necessary for operation) make it possible to operate this OR element at both the very low pressures typical for elements provided with membranes, and also the pressure conventionally used in industry and applicable to elements with disk-like sealing devices.

What I claim is:

1. A logic element for representing the OR function, the element being of the type having two inlets for feeding in a fluid, an outlet, and a sealing device which is displaceable under the action of the fluid in order to selectively bring about a connection between one or the other inlet and the outlet, wherein the improvement comprises:

a generally cylindrical housing having two spaced-apart inlets; a segment surrounded by and extending longitudinally in said housing and forming, with said housing, an annular chamber having a central axis, said segment including means defining an annular slot in a surface thereof, the slot having walls sloping together toward said central axis of the annular chamber, the slot and segment providing a connection between input portions of the annular chamber to either side of the slot;

an outlet disposed in the housing and including a passageway extending through said segment to a base portion of the slot; and a sealing device with an annular configuration disposed at least partly in the slot, the sealing device having sides which diverge from the sides of the slot and having a predetermined clearance relative to the slot, the slot being at least equal in its longitudinal dimension to the longitudinal dimension of the sealing device, so that the resulting clearance permits an initial displacement of the sealing device along the central longitudinal axis of the annular chamber with subsequent rotation about its own torsional axis until it engages with the whole surface of its corresponding side of the slot and thus sealingly interrupts the connection between one of said two inlets and the outlet.

2. The element of claim 1 and wherein:

the sealing device is of resilient material, and the outlet is located substantially coaxially with the central longitudinal axis of the chamber.

* * * * *